Feb. 21, 1950 E. C. LLOYD 2,498,168
ELECTRICALLY VIBRATED RETOUCHING STAND
Filed Oct. 27, 1947 3 Sheets-Sheet 1

Emmett C. Lloyd
INVENTOR.

BY *[signatures]*
Attorneys

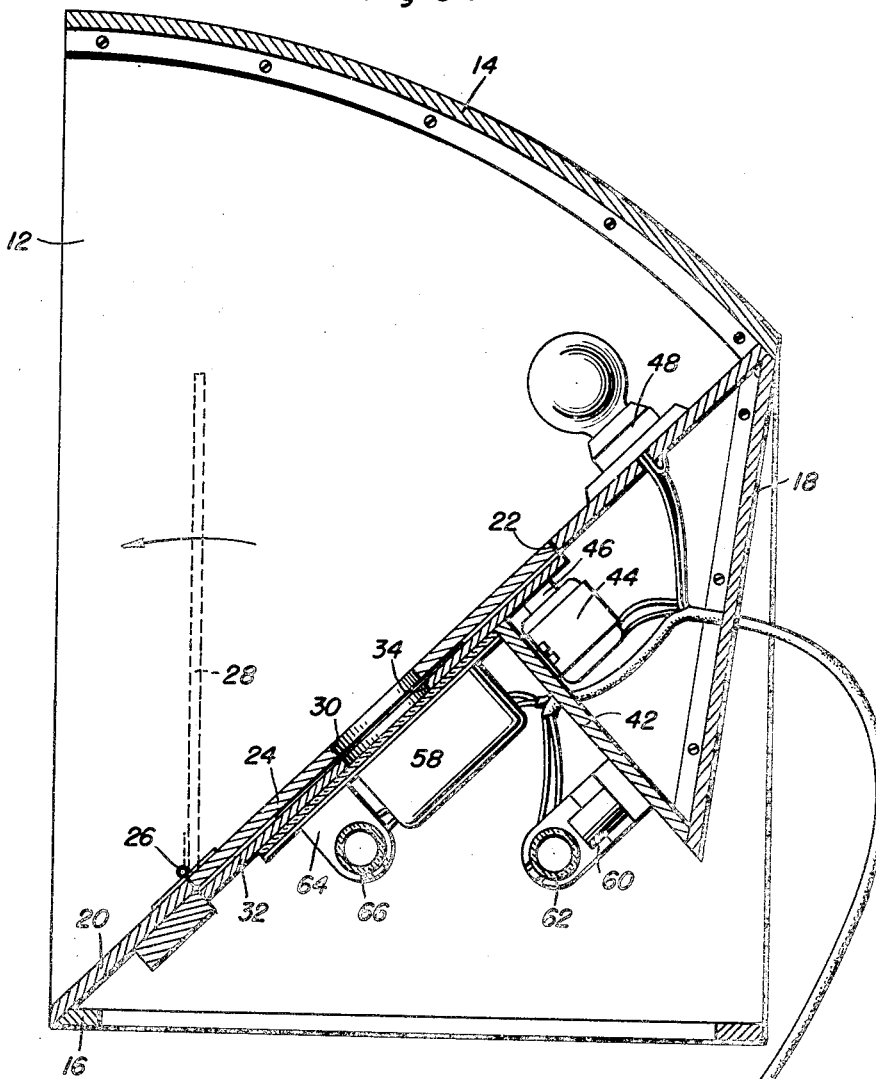

Feb. 21, 1950     E. C. LLOYD     2,498,168
ELECTRICALLY VIBRATED RETOUCHING STAND
Filed Oct. 27, 1947     3 Sheets-Sheet 3
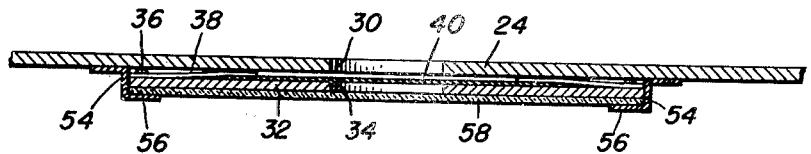
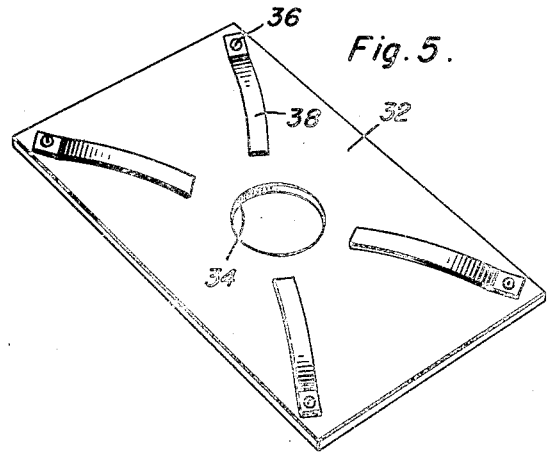
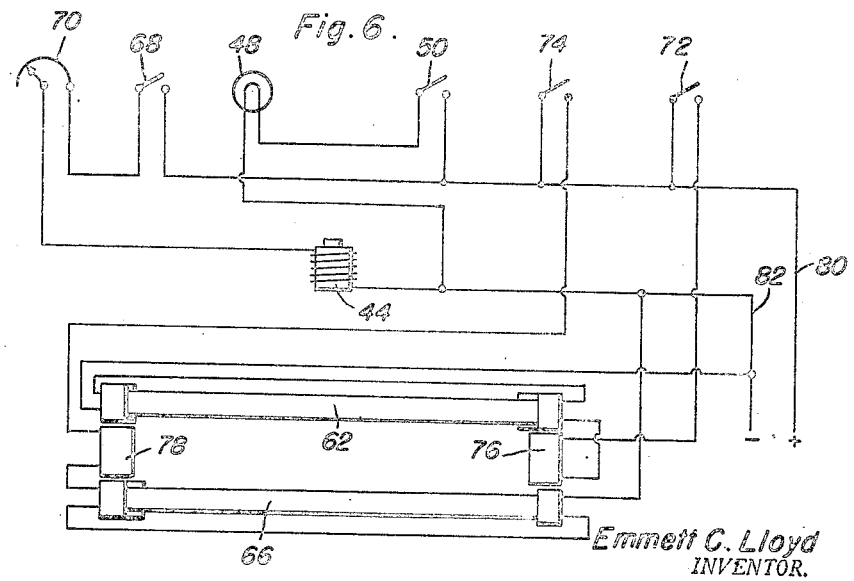
Emmett C. Lloyd
INVENTOR.

Patented Feb. 21, 1950

2,498,168

UNITED STATES PATENT OFFICE 2,498,168

ELECTRICALLY VIBRATED RETOUCHING STAND

Emmett C. Lloyd, Waco, Tex.

Application October 27, 1947, Serial No. 782,265

1 Claim. (Cl. 95—103)

This invention comprises novel and useful improvements in electrically vibrated retouching stands and more specifically pertains to a photographer's apparatus by means of which negatives may be mounted and vibrated in a plane perpendicular to the plane of the negatives for retouching the same by an appropriate tool in an improved manner.

An important feature of this invention is the provision of a casing having an inclined base therein beneath which is mounted a vibrating diaphragm having means for securing a negative thereto, beneath an opening in the base for obtaining access to the negatives.

A further feature of the invention is the provision of an aperture in the diaphragm, and the mounting of improved illuminating means beneath said aperture for illuminating the negative from the underside thereof whereby it may be readily viewed and retouched from the upper surface thereof through the opening in the base.

A further feature of the invention resides in the novel manner of vibrating the diaphragm by means of an electrical vibrator mounted beneath the diaphragm and operable to produce vibration in a plane perpendicular to the plane of the diaphragm.

Yet another feature of the invention resides in the provision of control means for regulating the frequency of the vibration from zero to a maximum in order to most efficiently retouch a negative by holding a stationary tool against the vibrating diaphragm.

Still another important feature of the invention resides in the provision of a translucent shield mounted beneath the diaphragm and constituting a dust cover therefor whereby dirt or other matter shaken from the diaphragm may be discharged downwardly, and whereby heat from the illuminating means may not be directly applied to the diaphragm or to the negative supported thereby.

A still further feature of the invention includes the provision of an illuminating source mounted upon the upper surface of the base for illuminating the diaphragm while a negative is applied thereto or removed therefrom.

A still further important feature of the invention includes the provision of a shield hinged to the base and movable into and out of the opening thereof, which shield is provided with a cut-away portion registering with the openings in the base and diaphragm and overlying the negative, whereby the shield may constitute a support for the hand of the operator, while the tool is positioned through the cut away portion of the shield into position to contact the vibrating negative and diaphragm.

And a final important feature of the invention to be specifically enumerated herein resides in an improved, compact and highly efficient elements and instrumentalities to effect a vibrating movement of the diaphragm and negative carried thereby as well as to facilitate the working of the surface and retouching of the negative by an appropriate tool.

These, together with various ancillary objects of the invention which will later become apparent as the following description proceeds, are attained by this device, a preferred embodiment of which is illustrated, by way of example only, in the accompanying drawings, wherein:

Figure 3 is a vertical longitudinal sectional view through the apparatus of Figures 1 and 2, showing the interior construction thereof, and showing an alternative position of the shield in dotted lines;

Figure 4 is a fragmentary detail view on an enlarged scale taken substantially upon the transverse plane of the section line 4—4 of Figure 2;

Figure 5 is a perspective view of the vibrating diaphragm showing the negative-holding means secured thereto; and Figure 6 is a diagrammatic sketch showing the electrical circuits of the device.

Figure 1:
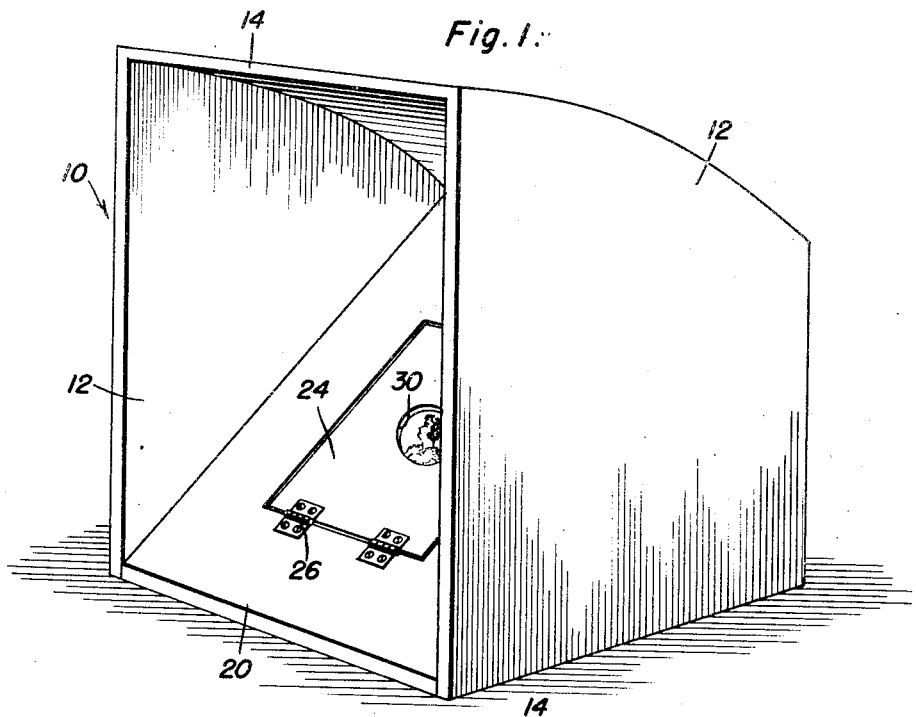
Figure 1 is a perspective view of the casing and looking into the apparatus.
Figure 2:
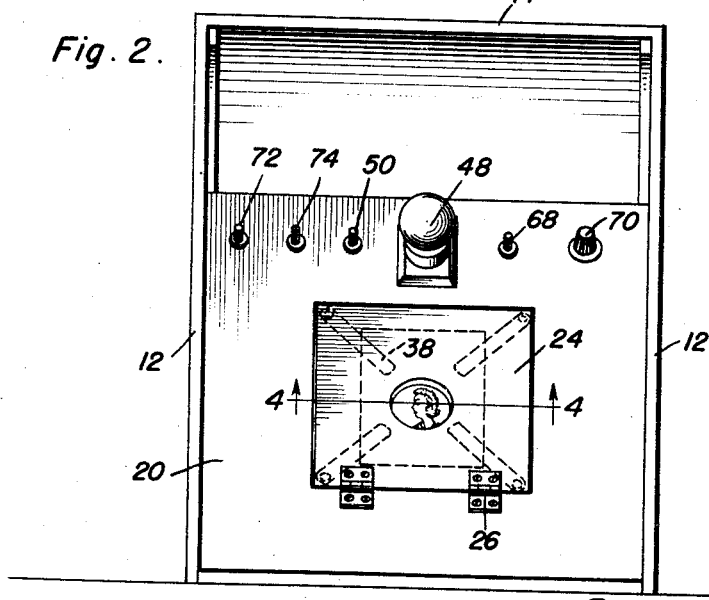
Figure 2 is a front elevational view of the apparatus of Figure 1.

Referring now more specifically to the accompanying drawings, wherein like numerals designate similar parts throughout the various views, attention is directed first to Figures 1, 2 and 3 wherein 10 indicates generally the complete retouching apparatus, which includes side walls 12 of any suitable material and of an appropriate shape, upon which are secured a downwardly curving cover 14 together with transversely extending strips 16 constituting the bottom of the device. From the lower end of the downwardly curving cover 14 is provided a downwardly and inwardly inclined back panel 18 secured to the side walls 12, to the top cover 14 and to a base plate 20 in any suitable manner.

This base plate 20 extends from the bottom 16 of the device at the open front thereof, at its lower end, and at its upper end is connected with the lower end of the cover 14, this base being also connected to the two side walls 12. As will be seen from Figures 1 and 3, this base is inclined at an angle which is found to be convenient for the purposes intended.

At any suitable point, preferably intermediate the ends and sides of the base 20, there is provided an opening 22 of any convenient size, within which is fitted a shield 24 consisting of a panel of any suitable material and hinged to the base 20, as at 26. As indicated in dotted lines at 28 in Figure 3, the shield may be swung outwardly from the base into its open position to uncover the opening 22. This shield 24 is provided with a generally central aperture 30 for a purpose to be now described.

Positioned beneath the base 20 and below the opening 22 thereof is a diaphragm 32 of any suitable material such as a fiber board or the like and which is mounted upon the base 20 in any convenient manner. This diaphragm is provided with an opening or aperture 34 of substantially the same size as the opening 30 in the shield 24, and registering therewith. As shown more clearly in Figure 5, upon the upper surface of the diaphragm is provided a plurality of negative holding means, these consisting of rivet or screw fasteners 36 securing flexible spring strips 38 from adjacent the corners of the diaphragm. As will be readily understood, a photographic negative is placed upon the diaphragm 32, overlying the aperture 34 thereof, and retained in proper position by the pressure of the resilient strips 38. By lifting the shield 24, access may be had to the diaphragm 32 through the opening 22 for the purpose of inserting or removing a negative as desired. The position of such a negative upon the diaphragm and beneath the shield is indicated clearly in Figure 4 at 40.

A convenient manner of mounting the diaphragm is depicted in Figure 3, whereby it may be seen that a support bracket 42, of wood or any other suitable material, extends from the rear panel 18 toward the under surface of the base 20 perpendicular thereto, and engages and supports the rear surface of the diaphragm upon the end of the bracket 42. In order to vibrate the diaphragm, an electrical vibrator 44 of any suitable and known construction is secured to the support member 42 and is provided with an electrically operated and reciprocable armature 46 which vibrates in a direction perpendicular to the surface or plane of the diaphragm and against the under or rear surface thereof. Obviously, as the vibrator is actuated, the diaphragm and the negative attached thereto are caused to vibrate or oscillate in a direction which is perpendicular to the plane of the negative and diaphragm.

It should be here noted that heretofore negative vibrating retouching machines all vibrate in the plane of the negative, whereby a pencil or stylus held against the negative will produce a stroke or line upon the surface thereof. In the operation of these prior devices, accordingly, great skill was required to limit the retouching to the exact area desired. In this device, on the other hand, since the diaphragm and negative vibrate in a plane perpendicular to the plane of the diaphragm, a retouching tool may be merely applied to the surface and the negative vibrated thereagainst. There is no tendency to produce a line across the surface of the negative, and consequently by moving the tool, the exact area to be treated may readily be covered.

In order to facilitate the insertion or removal of a negative from the holding means of the diaphragm, a light bulb 48 of any suitable type is mounted upon the plate 20 preferably upon the upper portion thereof, as shown in Figure 3, and is connected by suitable electric conduits to a switch 50 extending through the base 20 in convenient manner for controlling the operation of the light. It should be here noted that a suitable electric cable 52 provides a source of electric current for all the instrumentalities of this device.

Attention is now directed more specifically to Figure 4 wherein it will be seen that a pair of channel iron members or brackets 54 are secured to the under surface of the base 20 by any suitable means, these channel irons being provided with inturned flanges 56 for slidably and removably receiving a translucent glass cover plate 58. This plate is preferably spaced from and underlies the lower surface of the diaphragm 32, to provide a dead air space therebetween, to act as a baffle or shield to catch material thrown off by the vibrating diaphragm and to protect the latter from contact by dust or other undesirable matter, and to further shield the diaphragm and negative carried thereby from the heat of a source of illumination positioned therebeneath and to be now described.

To most effectively illuminate the negative and to provide a variation in the intensity of illumination, there is provided a pair of fluorescent or other light tubes beneath the base. One such tube consists of a pair of brackets 60 supported by the under surface of the support bracket 42, and carrying therebetween a fluorescent tube 62, while a similar pair of brackets 64 are mounted upon the lower surface of the plate 20 and support a similar tube 66.

Conveniently mounted upon the upper surface of the base 20 are a plurality of switches and controls for starting the fluorescent tubes 62 and 66, for controlling the light 48 and for controlling and adjusting the electric vibrator 44. These controls include a switch 68 for controlling the source of current to the vibrator, a rheostat 70, which may be of any known type, including one having a calibrated scale to give quickly the desired favorite settings of the rheostat, for varying the intensity of the current, and consequently the frequency of vibration, together with switches 72 and 74 for respectively controlling the fluorescent tubes 62 and 66.

As indicated best in the diagram of Figure 6, a pair of starting transformers 76 and 78 are connected with the circuits of the two tubes 62 and 66, in accordance with known conventional practice for this type of illumination.

It can thus be seen that one or both of the tubes 62 and 66 may be illuminated to produce the desired intensity of light beneath the negative 40 through the translucent cover or shield 58, through the diaphragm aperture 34 and through the shield aperture 30, to assist the operator in retouching the negative.

The glass plate, of a composition well known commercially as "Double flashed opal" has the main effect of providing an even distribution of light over the area of the opening in the diaphragm for uniformly illuminating the negative throughout its area, regardless of the position of the source of illumination. Without this translucent pane, the use of the upper tube alone would give a greater intensity of illumination upon the upper portion of the negative while the use of the lower tube alone would give the reverse result.

With this pane, however, either or both tubes will give a uniform illumination, thus greatly facilitating the ease of retouching a negative by this device.

Obviously, any suitable electric circuits may be employed to effect the desired results. One such satisfactory circuit is shown in Figure 6, wherein it will be seen that the electric cable for the source of current 52 is provided with a positive and negative lead 80 and 82 respectively. Each of the switches 72, 74, 50 and 68 is connected to the positive lead 80, and are connected in series with the devices which they control and are then grounded through the lead 82.

From the foregoing, it is believed that the manner of constructing and operating the device will be readily understood, and accordingly, further explanation is deemed to be unnecessary. However, since numerous modifications and equivalents will readily occur to those skilled in the art after a consideration of the foregoing specification and accompanying drawings, it is obvious that these are to be regarded as illustrative of the principles of the invention only, and it is not desired to limit the invention to the exact construction disclosed therein. It is therefore intended that all suitable modifications and equivalents may be resorted to falling within the scope of the appended claim.

Having thus described the invention, what is claimed as new is:

In a photographic retouching stand, an inclined base having an opening, a shield pivotally hinged on said base and fitted in said opening, said shield having an aperture therein and adapted to be rotated at an angle to said base, a diaphragm mounted on the under side of said base and having an aperture registering with the aperture in the shield and the opening in the base, resilient clips attached to said diaphragm for attaching a negative over the aperture in said diaphragm, a transparent cover secured to said base and underlying but spaced from said diaphragm, parallel channel members forming guides attached to the under surface of said base, said transparent cover and said diaphragm being slidably received in said channel members, said cover being of less size than said diaphragm, and means beneath said base and said diaphragm and at one end of said diaphragm vibrating said diaphragm and negative in a direction perpendicular to the plane thereof.

EMMETT C. LLOYD.

REFERENCES CITED

The following references are of record in the file of this patent:

UNITED STATES PATENTS

| Number | Name | Date |
|---|---|---|
| 522,372 | Hornberger | July 3, 1894 |
| 632,643 | Choate | Sept. 5, 1899 |
| 1,725,856 | Downs | Aug. 27, 1929 |
| 2,422,174 | Adams | June 17, 1947 |